United States Patent
Qian et al.

(10) Patent No.: US 9,634,591 B2
(45) Date of Patent: Apr. 25, 2017

(54) SYSTEM AND METHOD FOR MOTOR CONTROL USING POSITION SENSORS

(71) Applicant: Infineon Technologies AG, Neubiberg (DE)

(72) Inventors: Weizhe Qian, Beijing (CN); Wai Keung Frankie Chan, Singapore (SG)

(73) Assignee: Infineon Technologies AG, Neubiberg (DE)

( * ) Notice: Subject to any disclaimer, the term of this patent is extended or adjusted under 35 U.S.C. 154(b) by 0 days.

(21) Appl. No.: 14/828,280

(22) Filed: Aug. 17, 2015

(65) Prior Publication Data
US 2017/0054391 A1  Feb. 23, 2017

(51) Int. Cl.
H03K 5/00 (2006.01)
H02P 6/16 (2016.01)
H02P 6/00 (2016.01)
H02P 6/182 (2016.01)
H02P 27/08 (2006.01)

(52) U.S. Cl.
CPC ............. *H02P 6/16* (2013.01); *H02P 6/001* (2013.01); *H02P 6/182* (2013.01); *H02P 27/08* (2013.01)

(58) Field of Classification Search
CPC ................................. H02P 6/182; H02P 6/001
USPC ...... 318/400.13, 400.14, 400.2, 400.34, 722, 318/445, 459, 463, 484
See application file for complete search history.

(56) References Cited

U.S. PATENT DOCUMENTS

| | | | | |
|---|---|---|---|---|
| 4,922,169 A * | 5/1990 | Freeman | ............... | H02P 6/22 318/400.1 |
| 5,764,020 A * | 6/1998 | Maiocchi | ............... | H02P 6/00 318/400.11 |
| 8,278,860 B2 * | 10/2012 | Brown | ............... | H02P 6/182 318/400.01 |
| 8,339,077 B2 * | 12/2012 | Brown | ............... | H02P 6/182 318/400.1 |
| 8,436,564 B2 * | 5/2013 | Kern | ............... | H02P 6/16 318/400.01 |

OTHER PUBLICATIONS

Choi et al., "Position Compensation Method of BLDC Motor for Automotive Applications," IOSR Journal of Engineering, vol. 3, Issue 1, Jan. 2013, pp. 49-55.
Kim et al., "An Improved Rotor Position Estimation With Vector-Tracking Observer in PMSM Drives With Low-Resolution Hall-Effect Sensors," IEEE Trans. on Industrial Electronics, vol. 58, No. 9, Sep. 2011, pp. 4078-4086.
(Continued)

*Primary Examiner* — Bentsu Ro
*Assistant Examiner* — Thai Dinh
(74) *Attorney, Agent, or Firm* — Slater Matsil, LLP

(57) ABSTRACT

An embodiment method for motor control includes monitoring a plurality of position sensors coupled to a revolving motor. The monitoring includes measuring transition times of respective output patterns produced by the position sensors, the respective output patterns each including at least one transition time that repeats in accordance with each revolution of the motor. The method further includes determining a first revolution period in accordance with the measured transition times. The method also includes determining an elapsed fraction of the first revolution period that has elapsed since a start time of the first revolution period.

28 Claims, 10 Drawing Sheets

(56) References Cited

OTHER PUBLICATIONS

Morris et al., "Three-Phase Motor Controller IC Drives External FETs for PWM Current Control, Synchronous Rectificatin, and 100% Duty-Cycle Capability," Allegro MicroSystems, Inc., Product Description, Technical Paper STP 02-3, Oct. 2002, 10 pages.

Shao, Jianwen, "Direct Back EMF Detection Method for Sensorless Brushless DC (BLDC) Motor Drives," Master thesis, Virginia Polytechnic Institute and the State University, Sep. 2003, 91 pages.

\* cited by examiner

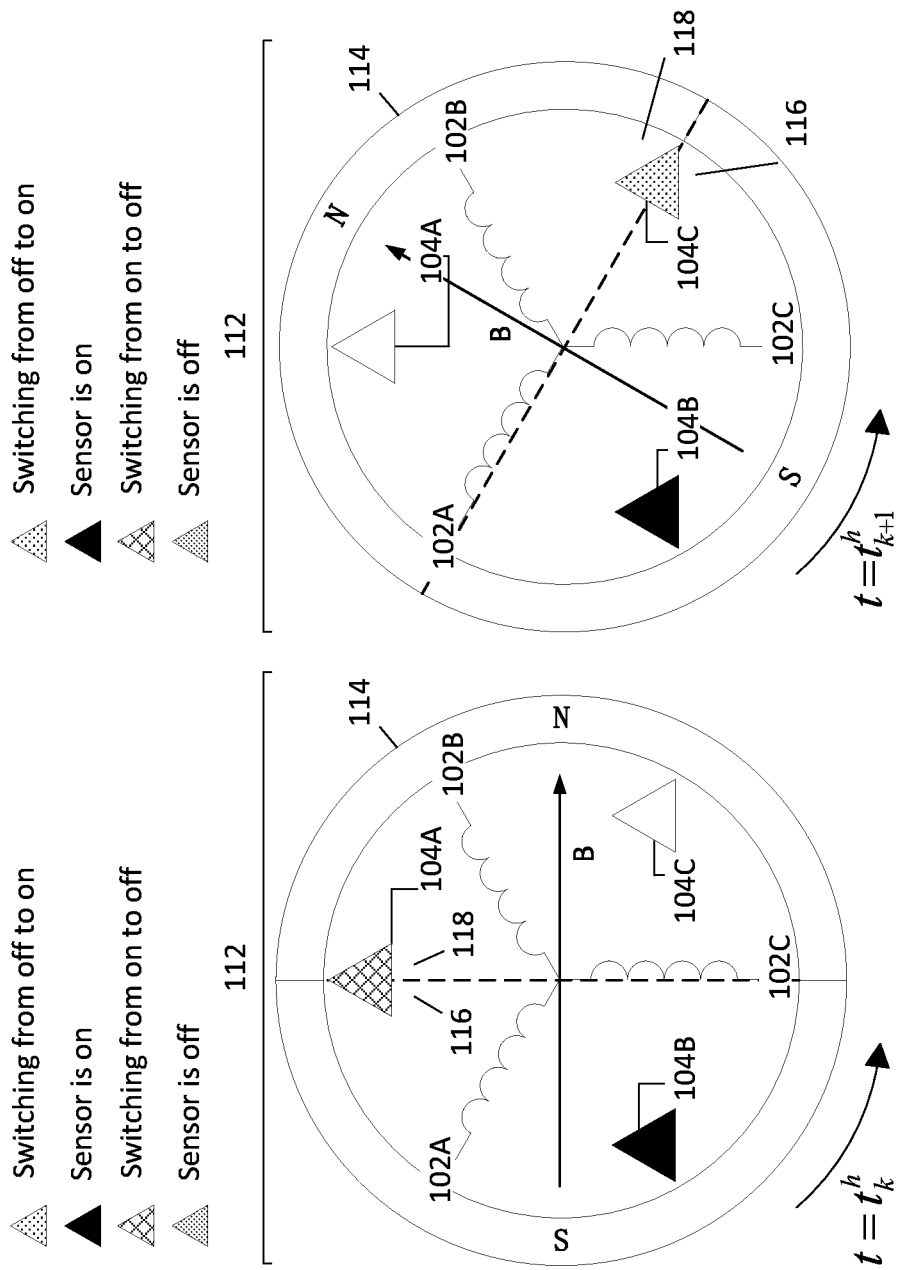

SYSTEM AND METHOD FOR MOTOR CONTROL USING POSITION SENSORS

TECHNICAL FIELD

The present invention relates generally to a system and method for motor control, and, in particular embodiments, to a system and method for motor control using position sensors.

BACKGROUND

Electronically commutated motors, or brushless motors, are useful for a variety of applications. These applications include Heating/Ventilation/Air Conditioning (HVAC) blowers, consumer appliances, pumps, cooling fans in electronic equipment, and cordless power tools.

Nevertheless, designing control systems for such brushless motors presents a number of challenges. Brushless motors are typically electronically commutated using control systems employing feedback from position sensors (e.g. magnetic Hall sensors). These position sensors, however, do not indicate correct commutation times due to of a variety of factors. These factors include imprecise mounting of the position sensors due to limited available space, hysteresis output from the sensor itself, and imperfections in the sensor manufacturing process. The inaccurate commutation points that result can cause imbalanced phase conduction, torque ripples, and reduced power efficiency. Furthermore, because many brushless motors are configured to generate a sinusoidal back-Electromotive Force (EMF) during operation, sinusoidal-weighted control is desirable to provide smoother and more precise control for such motors, especially at low speeds. However, generating sinusoidal-weighted motor control signals requires higher resolution and more highly adaptive dynamic control than that which is provided by typical digital-output implementations of position sensors.

SUMMARY OF THE INVENTION

In accordance with an embodiment of the present invention, a method for motor control is provided. The method includes monitoring a plurality of position sensors coupled to a revolving motor. The monitoring includes measuring transition times of respective output patterns produced by the position sensors, the respective output patterns each including at least one transition time that repeats in accordance with each revolution of the motor. The method further includes determining a first revolution period in accordance with the measured transition times. The method also includes determining an elapsed fraction of the first revolution period that has elapsed since a start time of the first revolution period.

In accordance with another embodiment of the present invention, a motor control circuit is provided. The circuit is configured to monitor a plurality of position sensors coupled to a revolving motor. The monitoring includes measuring transition times of respective output patterns produced by the position sensors. The circuit is further configured to measure back-Electro-Motive Force (EMF) of the motor revolving in accordance with a calibration revolution period. The circuit is also configured to calculate, during a calibration sequence, a plurality of commutation error fractions relative to the measured transition times.

In accordance with another embodiment of the present invention, a motor controller is provided. The controller includes a position-generating circuit that includes a period determination circuit configured to be coupled to position sensors of a motor. The position-generating circuit also includes a step-tick generator coupled to an output of the period determination circuit. The step-tick generator is configured to produce a predetermined number of pulses in one period determined by the period determination circuit.

BRIEF DESCRIPTION OF THE DRAWINGS

For a more complete understanding of the present invention, and the advantages thereof, reference is now made to the following descriptions taken in conjunction with the accompanying drawings, in which:

FIGS. 1A-D are block diagrams of a motor for use in a motor control system in accordance with embodiments of the present invention;

DETAILED DESCRIPTION OF ILLUSTRATIVE EMBODIMENTS

The making and using of the presently preferred embodiments are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

The present invention will be described with respect to preferred embodiments in a specific context, a system and method for control of a three-phase, two-pole, brushless motor with external rotor, that has a Direct Current (DC) power connection, and an inverter that is switched by Pulse-Width Modulation (PWM). Further embodiments may be applied to other motor control systems that require a different number of phases, poles, a different rotor structure, a different inverter modulation scheme, or an Alternating Current (AC) power connection.

In an embodiment, a rotor position is measured as an elapsed time since the beginning of a current revolution of the motor, and this rotor position is used to look up the next commutation time for switching the windings of the motor to either an active or floating state. The measurement of the rotor position uses the output signals of all of the position sensors mounted in the motor so that varying motor speed can be taken into account. In some embodiments, magnetic Hall sensors may be used as the position sensors. Other embodiments may use different position sensors such as, for example, optical or mechanical position sensors.

Based on the current rotor position, the next commutation time is found by referring to a Look-Up Table (LUT) or other storage structure in which all the commutation times for an entire revolution of the motor have been previously stored. These commutation times are calculated and stored during a calibration sequence that occurs prior to normal motor operation. This calibration sequence uses the back-EMF of the motor as measured on the winding that is floating at any point during the motor revolution. The commutation times are adjusted during the calibration sequence so that the waveform of the floating back-EMF does not exhibit jump discontinuities when commutation occurs.

Figures 1C, 1D:
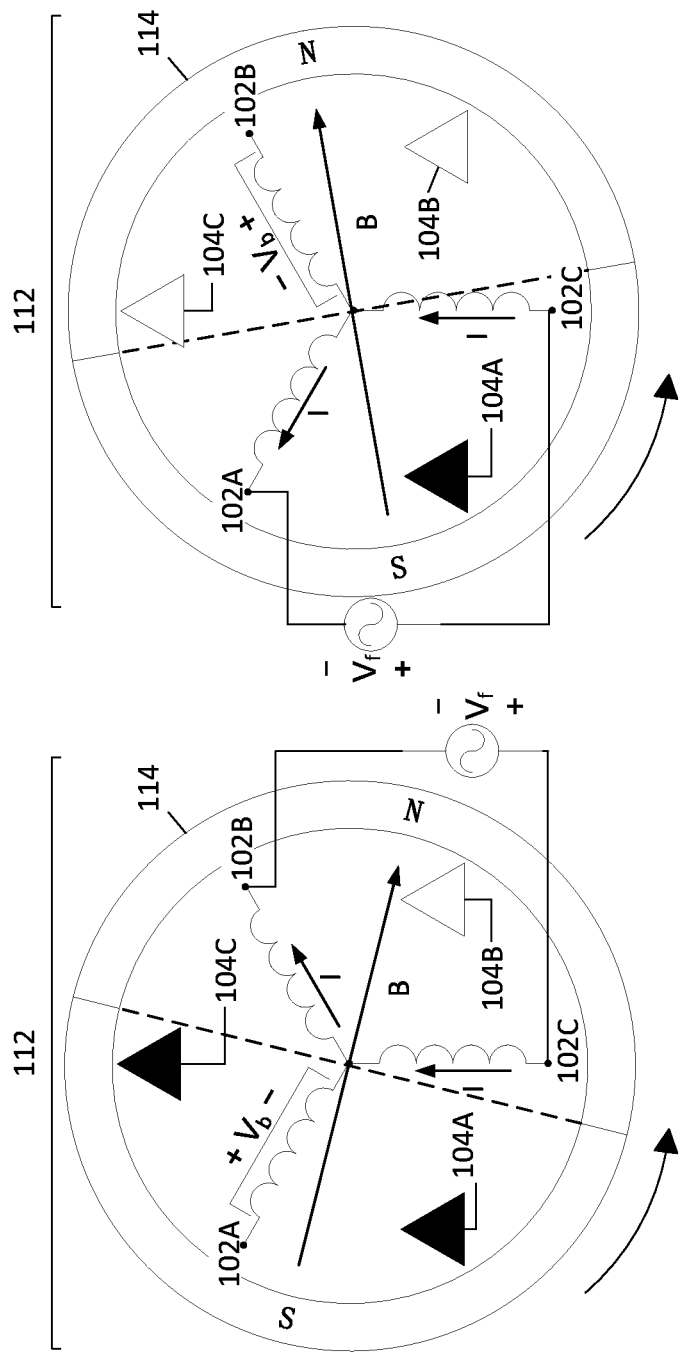

FIG. 1, which includes FIGS. 1A-D, is a block diagram of an embodiment motor with Hall sensors for use in a motor control system. Referring now to FIG. 1A, The motor 112 has Hall sensors 104A-C that are semiconductor devices that provide an electrical voltage output that is switched on or off by the magnetic field B of a permanent magnet rotor 114. Output signals coming from these Hall sensors 104A-C can thereby be used to detect the position of the rotor as it completes a complete revolution. Although any number of Hall sensors may be used, in embodiment of FIG. 1A three Hall sensors 104A-C are shown. The motor 112 has magnetic polar regions which, in the embodiment of FIG. 1A-D, include south polar region 116 and north polar region 118, although in other embodiments any number of poles may be present. The south polar region 116 is illustrated as being divided from the north polar region 118 by a line that is perpendicular to the direction of the magnetic field. As the rotor 114 rotates, the Hall sensors in the south polar region 116 are on, while the Hall sensors in the north polar region 118 are off. For example, when the rotor 114 is at the instantaneous position shown in FIG. 1A and is turning counter-clockwise, Hall sensor 104A is leaving the south polar region 116 and is entering the north polar region 118. Accordingly, Hall sensor 104A is switched from on to off. In the foregoing example, Hall sensor 104B remains in the south polar region 116 and thus remains switched on, and Hall sensor 104C remains in the north polar region 118 and thus remains switched off.

Another example is shown in FIG. 1B, which depicts the motor at the next time in which any of the Hall sensors 104A-C is switched on or off, which is referred to in this disclosure as a Hall transition time. This disclosure denotes the $k^{th}$ Hall transition time as $t_k^h$ (depicted in FIG. 1A) and the period between two Hall transition times $t_k^h$ and $t_{k+1}^h$ is referred to as a Hall period $\tau_k^h$. Because the embodiment motor 112 of FIG. 1A-D has three Hall sensors and two polar regions, six Hall periods $\tau_k^h \ldots \tau_{k+5}^h$ make up each complete revolution $T_k$ of the rotor 114. Referring again to FIG. 1B, at time $t_{k+1}^h$ Hall sensor 104C is leaving the north polar region 118 and is entering the south polar region 116, and thus is switched from off to on, Hall sensor 104A remains in the north polar region 118 such that it remains off, and Hall sensor 104B remains in the south polar region 116 such that it remains on.

Referring now to FIG. 1C, the rotor 114 rotates in accordance with a feed voltage $V_f$ applied to a subset of the windings 102A-C to generate a motor current I. Although any number of phases may be used, in the embodiment of FIG. 1, the motor 112 is a three-phase motor with three windings 102A-C. Switching occurs during the rotation of the rotor 114 so that during typical operation only two of the motor windings are simultaneously activated by being provided feed voltage to generate the motor current, while the third winding is deactivated so that it remains at a floating voltage without current flow. For example, in FIG. 1C the feed voltage is applied between winding 102C and winding 102B while winding 102A is floating. As the rotor 114 turns counter-clockwise from its position in FIG. 1C to a new position in FIG. 1D, the feed voltage is removed from winding 102B, which in FIG. 1D is floating, and the feed voltage is applied in FIG. 1D between winding 102C and winding 102A.

As the rotor 114 rotates, a back-EMF $V_b$ is generated across all of the windings. Because the back-EMF interacts with the feed voltage across the active windings, it is most easily measured across the floating winding. This floating back-EMF is useful for detecting the interaction between the magnetic field of the rotor 114 and the switching times at which two windings are activated and a third winding is simultaneously deactivated. Such switching times for the windings are referred to in this disclosure as commutation times. In this disclosure, the $k^{th}$ commutation time is denoted as $t_k^c$, and the period between two commutation times $t_k^c$ and $t_{k+1}^c$ is referred to as a commutation period $\tau_k^c$.

Figure 2:
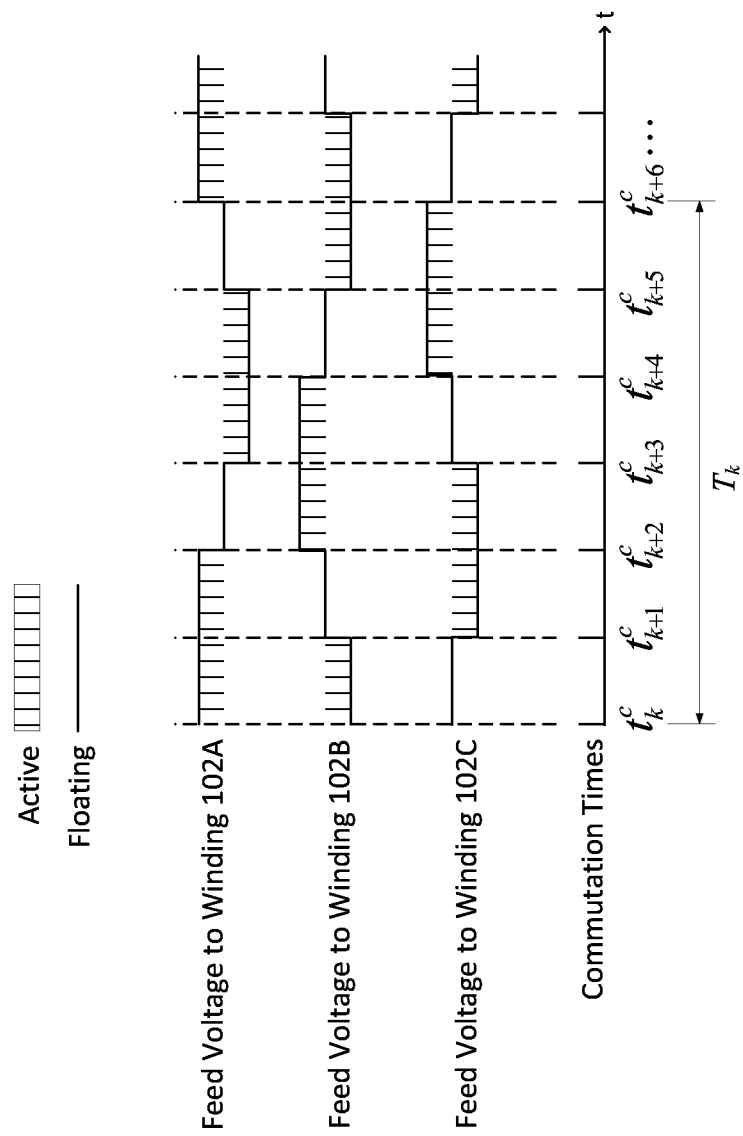
FIG. 2 is a timing diagram showing a commutation pattern of a motor control system in accordance with embodiments of the present invention.

Referring to FIG. 2, the selection of which two windings are active is varied at each commutation time in a pattern that repeats with each complete revolution $T_k$. This commutation pattern is depicted in FIG. 2 for an embodiment three-phase motor 112 with two polar regions. For example, after commutation time $t_k^c$, a feed voltage is applied across windings 102A and 102B, and winding 102C has a floating voltage with no current. After commutation time $t_{k+1}^c$, the feed voltage is applied across winding 102A and winding 102C, and winding 102B has a floating voltage with no current. The complete set of active winding selections for the complete revolution $T_k$ are summarized in Table 1.

TABLE 1

Pattern of Active and Floating Windings During Normal Operation

| | Winding 102A | Winding 102B | Winding 102C |
|---|---|---|---|
| Starting Commutation Time $t_k^c$ Ending Commutation Time $t_{k+1}^c$ | Active | Active | Floating |
| Starting Commutation Time $t_{k+1}^c$ Ending Commutation Time $t_{k+2}^c$ | Active | Floating | Active |
| Starting Commutation Time $t_{k+2}^c$ Ending Commutation Time $t_{k+3}^c$ | Floating | Active | Active |
| Starting Commutation Time $t_{k+3}^c$ Ending Commutation Time $t_{k+4}^c$ | Active | Active | Floating |
| Starting Commutation Time $t_{k+4}^c$ Ending Commutation Time $t_{k+5}^c$ | Active | Floating | Active |
| Starting Commutation Time $t_{k+5}^c$ Ending Commutation Time $t_{k+6}^c$ | Floating | Active | Active |

Figure 3A:
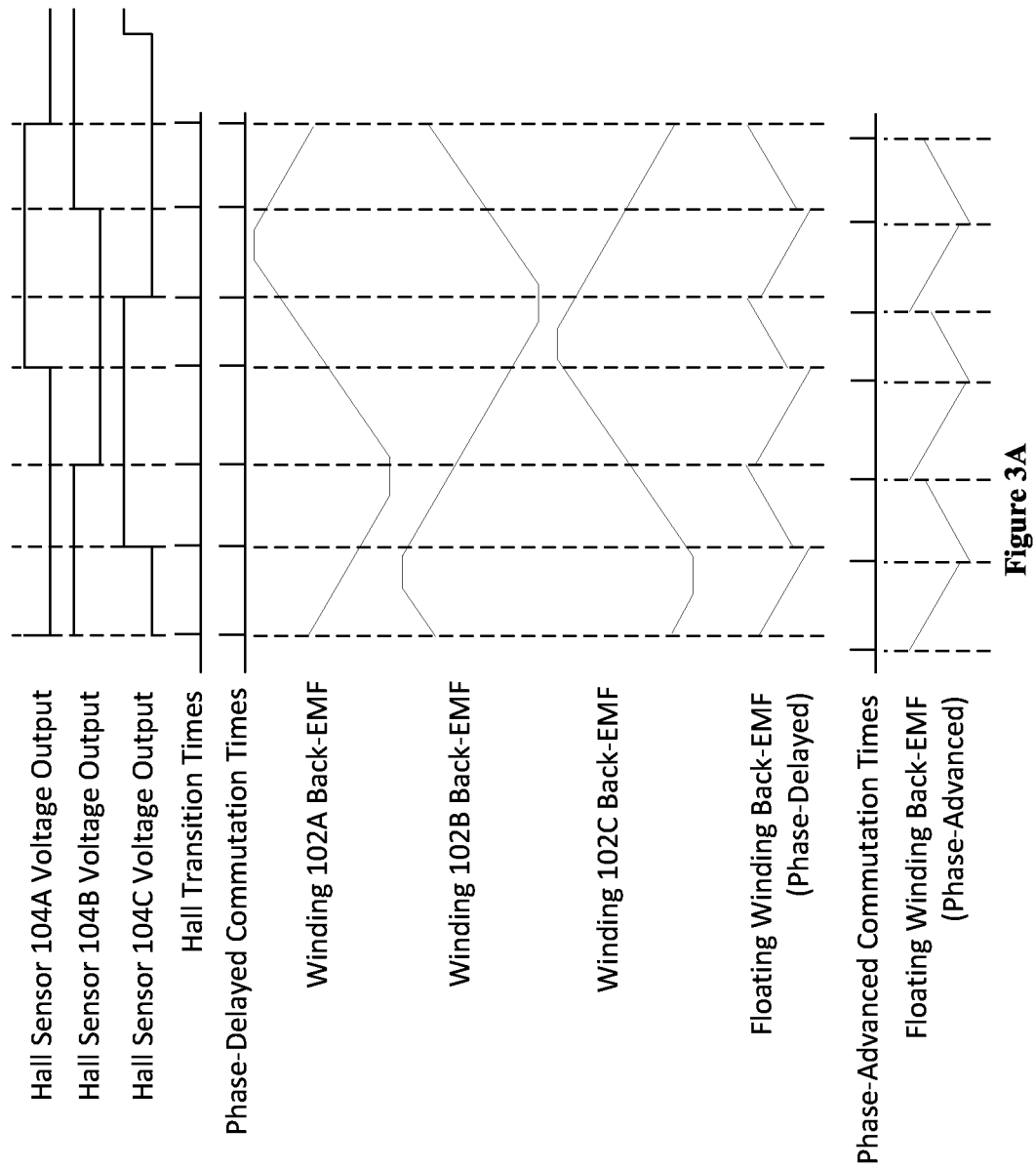
FIGS. 3A-B are timing diagrams showing adjustment of commutation times in accordance with embodiments of the present invention.
Figure 3B:
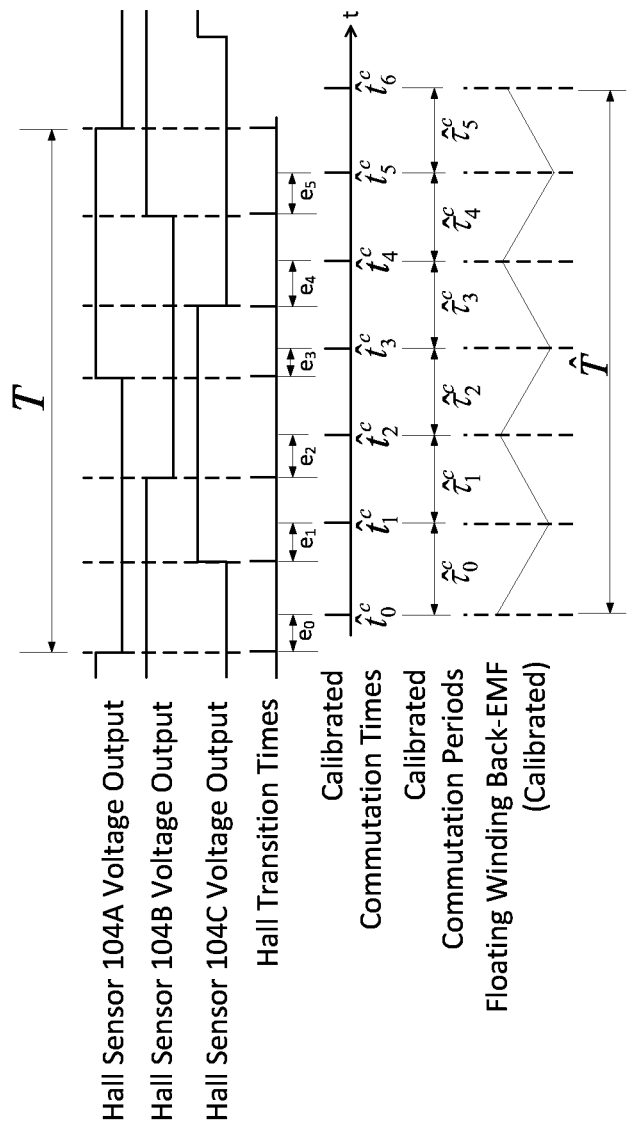

FIGS. 3A and 3B are timing diagrams that show how the back-EMF on the floating winding can be used to calibrate the commutation times relative to the Hall transition times. The embodiment motor of FIG. 1A-D is a three-phase star-connected motor such that, as the rotor 114 turns and the direction of the magnetic field changes, the back-EMF in each of the windings 102A-C varies in a trapezoidal waveform shown in FIG. 3A. In other embodiments, a motor is used that generates a sinusoidal back-EMF.

The precise waveform of the back-EMF across the instantaneously floating winding is dependent on the commutation times. Prior to calibration, these commutation times may be assigned to occur at each Hall transition time, i.e. at each rising or falling edge of the voltage output from Hall sensors 104A-C. However, due to hysteresis delaying detection of the rotor magnetic field by the Hall sensors, along with imprecise mechanical mounting of Hall sensors, when the commutation times are assigned to occur precisely at these Hall transition times, a phase shift such as, for example, a delay occurs. With this phase delay, there is a discontinuity between the back-EMF measured at the winding that is then floating at the end of each commutation period and the back-EMF measured at the winding that is floating at the beginning of the next commutation period. To overcome this phase delay, the commutation times might be assigned to occur earlier in time. However, if the commutation occurs too early, a phase-advance problem occurs. Similarly, with this phase advance there is a discontinuity between the back-EMF measured at the winding that is then floating at the end of each commutation period and the back-EMF measured at the winding that is floating at the beginning of the next commutation period.

Referring now to FIG. 3B, each commutation time may be adjusted such that the back-EMF measured at the winding that is then floating at the end of each commutation period is equal to the back-EMF measured at the winding that is floating at the beginning of the next commutation period. When the back-EMF is thus aligned, the commutation occurs at calibrated commutation times $\hat{t}_0^c \ldots \hat{t}_5^c$ that are the respective starting times of calibrated commutation periods $\hat{\tau}_0^c, \ldots \hat{\tau}_5^c$, which in turn make up a complete revolution $\hat{T}$. These calibrated commutation times are adjusted relative to respective Hall transition times by commutation errors $e_0 \ldots e_5$. The Hall transition times are for Hall signals in a complete motor revolution period T. Although a trapezoidal back-EMF is depicted in FIGS. 3A and 3B, in other embodiments a motor with a sinusoidal back-EMF is calibrated using the same foregoing back-EMF alignment technique.

Figure 4:
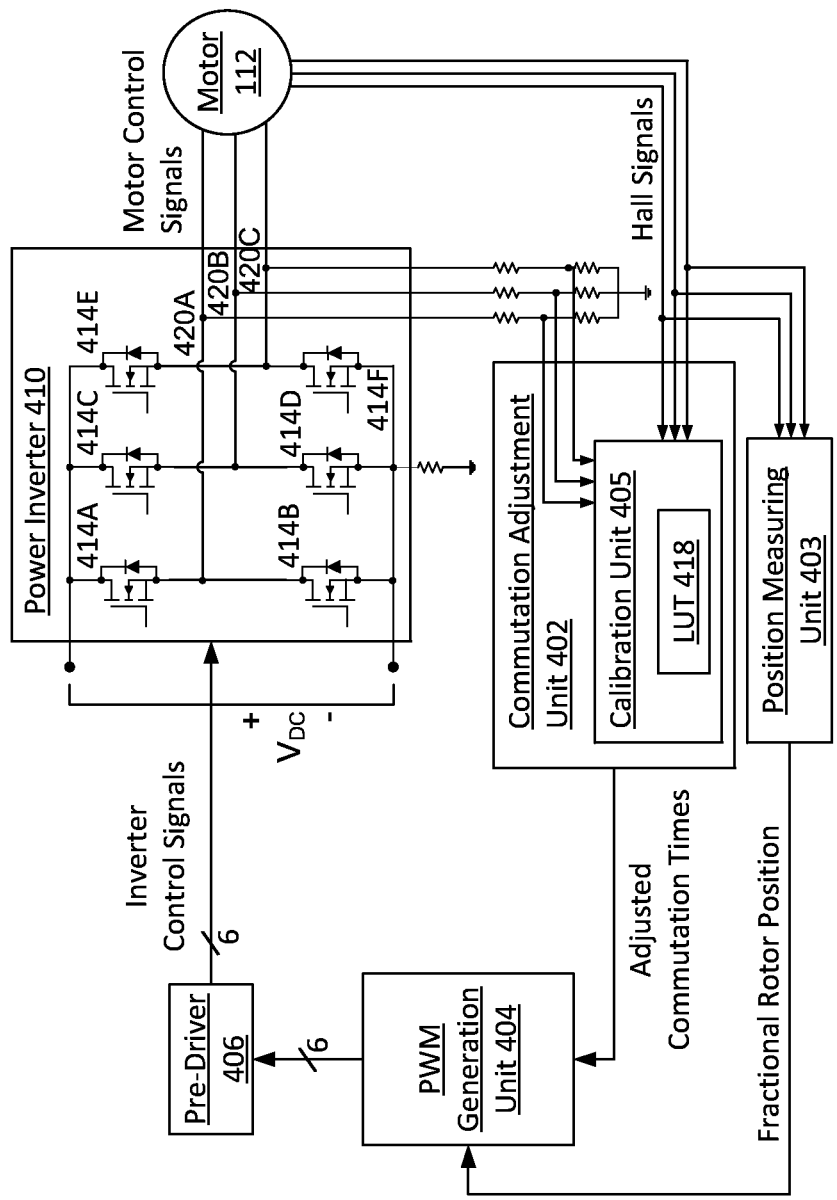
FIG. 4 is a block diagram of a motor control system that includes commutation adjustment and position measurement in accordance with embodiments of the present invention.

FIG. 4 is a block diagram of an embodiment two-pole three-phase motor control system that calibrates the motor commutation times in a calibration sequence and then adjusts these commutation times during normal operation to provide dynamic speed control. In the three-phase, two-pole embodiment of FIG. 4, three bidirectional motor control signals are each provided to a respective winding to control the motor 112. Although in the embodiment of FIG. 4 these bidirectional motor control signals are not sinusoidal, this disclosure refers to them as "AC motor control signals." During any commutation period, a feed voltage is applied between two of the three AC motor control signals to provide a motor current across two active windings of the motor 112, while no voltage is applied across a third motor winding. These AC motor control signals are generated in accordance with a PWM chopping of a subset of the six inverter switches 414A-414F, which are each connected to a DC voltage source. These inverter switches 414A-414F may be, for example, MOSFETs, IGBTs, or other transistors. The power inverter 410 may be, for example, a bridge inverter.

As an example, the inverter switches 414A-414F may be PWM-chopped at a frequency of 10 kHz during a 6 millisecond period in which a given winding is active. In this example, 60 PWM chopping cycles would occur within the active period, and each of the PWM chopping cycles would have a first stage and a second stage.

In the first stage of PWM chopping of the AC motor control signals, the motor current is delivered on a first active winding by closing a "high-side" inverter switch located between the first winding and the positive terminal of the DC voltage source, and the motor current is returned on a second active winding by simultaneously closing a "low-side" inverter switch located between the second active winding and the negative terminal of the DC voltage source. The foregoing high-side and low-side switches should not be connected to the same motor winding, unlike, for example, inverter switches 414A and 414B that are connected to the same motor winding. For a second stage of PWM chopping, a different current path is used depending on whether the system is configured to perform "one-side chopping" or "two-side chopping." In a first one-side chopping embodiment, the high-side inverter switch that was closed in the first stage is opened during the second stage, but the low-side inverter switch remains closed. In this configuration, during the second stage current flows from the negative terminal of the DC voltage source through the body diode of a first inverter switch that is connected to the first active winding, then through the first active winding and the second active winding, and then through the low-side inverter switch back to the negative terminal of the DC voltage source. In a second one-side chopping embodiment, the low-side inverter switch that was closed in the first stage is opened during the second stage, but the high-side inverter switch remains closed.

In two-side chopping, both the high-side and low-side inverter switches that were closed in the first stage are opened. In a first two-side chopping embodiment, current flows during the second stage from the negative terminal of the DC voltage source through the body diode of a first inverter switch that is connected to the first active winding, then through the first active winding and the second active winding, and then through the body diode of a second inverter switch that is connected between the second active winding and the positive terminal of the DC voltage source. In a second two-side chopping embodiment, synchronous rectification is used such that the first inverter switch and the second inverter switch are closed during the second stage to prevent efficiency losses through the body diodes.

As an example of the chopping of the inverter switches, during the first stage the motor current is delivered on a first active winding that is connected to terminal 420C and is returned on a second active winding that is connected to terminal 420B. Inverter switch 414E is a high-side inverter switch that is closed to connect terminal 420C to the positive terminal of the DC voltage source, and inverter switch 414D is a low-side inverter switch that is closed to connect terminal 420B to the negative terminal of the DC voltage source. In one-side chopping, inverter switch 414E is opened during the second stage, but inverter switch 414D remains closed, so that current flows from the negative terminal of the DC voltage source through the body diode of inverter switch 414F to terminal 420C, then through the first active winding and the second active winding to terminal 420B, and then through inverter switch 414D back to the negative terminal of the DC voltage source. In two-side chopping, both inverter switch 414E and inverter switch 414D are opened during the second stage so that current flows from the negative terminal of the DC voltage source through the body diode of inverter switch 414F to terminal 420C, then through the first active winding and the second active winding to terminal 420B, and then through the body diode of inverter switch 414C to the positive terminal of the DC voltage source.

As the rotor of motor 112 rotates, it generates back-EMF across the motor windings. The motor 112 provides three uncalibrated Hall sensor measurements to a Commutation Adjustment Unit 402. The back-EMF waveforms are also provided to the Calibration Unit 405 of the Commutation Adjustment Unit 402. In an initial calibration sequence, the motor is spun at a constant speed so that the back-EMF of the respective motor winding that is floating in each commutation period can be used to calibrate commutation times relative to the Hall transition times. During this calibration sequence, two-side chopping is used to reduce free-wheeling noise, and hence the floating back-EMF waveform is cleaner while it is being measured. Commutation errors $e_0 \ldots e_5$ are each calculated as a time difference between the previous Hall transition time and the calibrated commutation time. At the end of the calibration sequence, the Calibration Unit 405 calculates the commutation errors as a fraction of the calibration revolution period T and stores these fractional commutation errors $e_{0\ldots5}|T$ in a Look-Up Table (LUT) 418.

During normal operation of the embodiment two-pole, three-phase motor 112, the Commutation Adjustment Unit 402 uses the Hall signals to measure the current revolution period $T_k$, which will vary as the motor speed changes. The Commutation Adjustment Unit 402 then calculates each of the commutation errors $\hat{e}_{0\ldots5}$ for the current revolution period, determines adjusted commutation times from these current commutation errors, and provides the adjusted commutation times to the PWM Generation Unit 404. The current commutation errors are calculated from the fractional commutation errors that are stored in LUT 418, according to the following equation:

$$\hat{e}_x = T_{k+1}(e_x|T), \text{ where } x=0 \ldots 5. \quad (1)$$

A Position Measuring Unit 403 also uses the Hall signals to measure the rotor position as a fraction of time elapsed relative to the start of the most recent revolution period, or $t'|T_k$. The Position Measuring Unit 403 provides this fractional rotor position to the PWM Generation Unit 404. In some embodiments, this fractional rotor position may be used by the PWM Generation Unit 404 to generate a sinusoidal PWM or Space Vector PWM (SVPWM) modulation. Under such modulation schemes, the PWM Generation Unit 404 may in some embodiments use a second LUT (not shown) that stores duty-cycle values indexed by the fractional rotor position, where these duty-cycle values are for sinusoidally weighting the pre-driver input signals. In some embodiments, the PWM duty cycle value may also be determined in accordance with a desired motor speed.

In the embodiment of FIG. 4, the PWM Generation Unit 404 then generates six pre-driver input signals, which are PWM signals and which are varied to switch the windings of the motor 112 in accordance with the adjusted commutation times and the fractional rotor position. In some embodiments, the pre-driver input signals include a phase advance that is applied by the PWM Generation Unit 404 to the determined next commutation time.

The pre-driver input signals are amplified by pre-driver 406 to generate six commutation control signals that are PWM signals for controlling the power inverter 410. The power inverter 410 then generates the AC motor control signals for controlling the motor 112. In some embodiments, the power inverter 410 generates the AC motor control signals using one-side chopping. In other embodiments, the power inverter 410 generates the AC motor signals using synchronous rectification.

Figure 5:
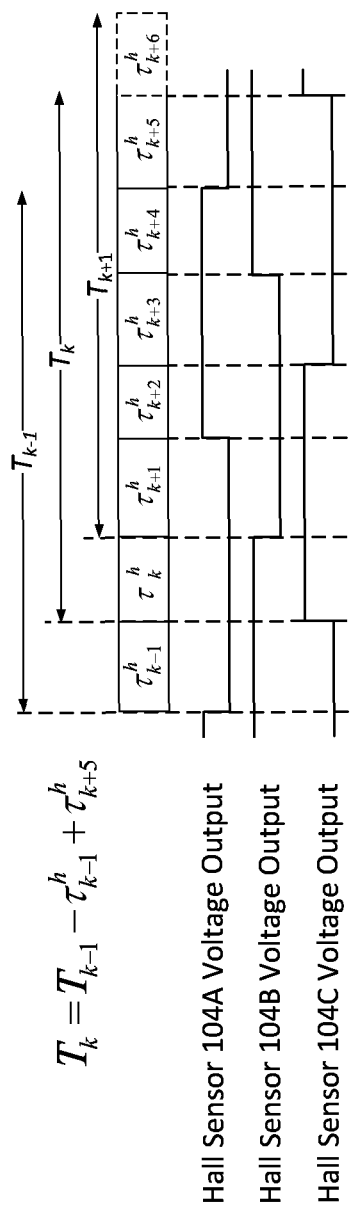
FIG. 5 is a timing diagram of a method for updating a dynamically changing motor revolution period in accordance with embodiments of the present invention.

FIG. 5 is a timing diagram showing how the Position Measuring Unit 403 measures the length of the current revolution period to provide high-resolution rotor position measurement as the motor speed changes during normal operation. In the two-phase, three-pole embodiment of FIG. 4, the previous revolution period $T_{k-1}$ was calculated as the sum of the six Hall periods $\tau_{k-1}^h$ to $\tau_{k+4}^h$ that made up that previous revolution period $T_{k-1}$. To save computations, these six Hall periods $\tau_{k-1}^h$ to $\tau_{k+4}^h$ are stored in a FIFO. The current revolution period $T_k$ can then be updated during each Hall period by simply subtracting the first Hall period of the previous revolution and adding the most recently measured Hall period, according to the following equation:

$$T_k = T_{k-1} - \tau_{k-1}^h + \tau_{k+5}^h. \quad (2)$$

Figure 6:
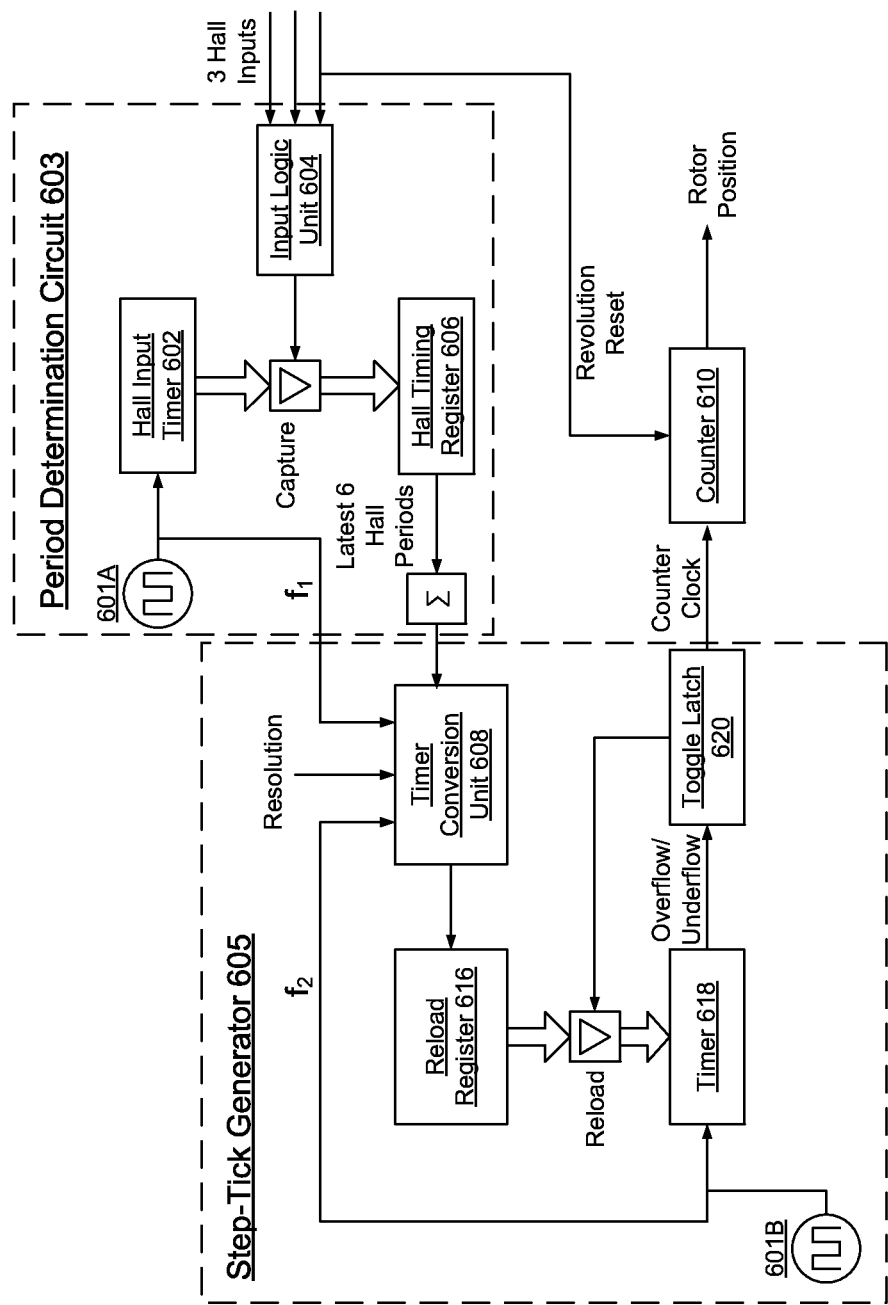
FIG. 6 is a block diagram of a position measurement circuit in accordance with embodiments of the present invention.

FIG. 6 is a block diagram of an embodiment position measuring circuit that can be used in the motor control system of FIG. 4. A step-tick generator 605, which has a resolution setting that may either be fixed or adjustable, includes a counter 610. The counter 610 is reset by a rising or falling edge on an arbitrarily selected one of the Hall signals, which indicates the beginning of a new rotor revolution. Following this reset signal, the counter 610 counts up from zero to indicate the rotor position formatted as the product of the resolution setting (measured in counts per revolution) multiplied by the fraction of the current revolution period that has elapsed. Each such increment of the counter 610 is referred to in this disclosure as a "step-tick." To measure the fractional rotor position, the counter 610 must count faster when the motor speeds up, or equivalently, when the current revolution period decreases.

Referring again to FIG. 6, to measure the current revolution period and to increase the counter speed, the Position Measuring Unit 403 uses two clocks 601A and 601B, which operate at respective frequencies $f_1$ and $f_2$ and which each have a respective number of clock cycles that have elapsed since each clock's arbitrary start time. In some embodiments, $f_2$ is a power of two times faster than $f_1$. Clock 601A is included in a period determination circuit 603 that also includes a Hall input timer 602, an input logic unit 604, and a Hall timing register 606. At each Hall transition time, input logic unit 604 detects a rising or falling edge on any of the Hall sensor signals and causes the capture of the number of $f_1$-frequency clocked cycles of clock 601A that have elapsed, as measured by Hall input timer 602. This captured number of $f_1$-frequency clocked cycles is then stored as a Hall transition time in Hall timing register 606, and the number of $f_1$-frequency clock cycles in the current revolution period is then calculated according to Equation 2 as the sum of the latest six Hall periods. This revolution period measured in $f_1$-frequency clocked cycles is provided to a timer conversion unit 608. The timer conversion unit 608 converts the revolution period measured in $f_1$-frequency clocked cycles ($T^{f_1}$) to the number of $f_2$-frequency clocked cycles of clock 601B per step-tick ($T^{f_2/step}$). To do so, the timer conversion unit 608 divides the revolution period in clock 601A cycles by resolution r of the resolution setting, which is measured in step-ticks per revolution. The timer conversion unit 608 then multiplies the resulting quotient by the ratio of the clock 601B frequency $f_2$ relative to the clock 601A frequency $f_1$. In some embodiments this clock frequency ratio is a power of 2. In some embodiments, multiplying the quotient by the clock frequency ratio or a power of 2 may improve the overall resolution. The foregoing operation of the timer conversion unit 608 is summarized in the following equation:

$$T^{f_2/step} = \left(\frac{T^{f_1}}{r}\right)\left(\frac{f_2}{f_1}\right). \quad (3)$$

This number of cycles per step-tick $T^{f/step}$ is then stored in reload register 616 and is loaded into timer 618. Timer 618 counts up or down by one during every clock 601B cycle until it respectively reaches an overflow or underflow condition, at which point it triggers toggle latch 620 to produce a pulse to increment the count of counter 610 and also to reload the timer 618 from the reload register 616 with the last stored value of $T^{f/step}$.

In an embodiment, all the components of FIG. 6 are implemented using only a microcontroller Capture/Compare Unit (CCU) (e.g., a CCU6 of an Infineon microcontroller) and a General Purpose Timer (GPT) block of an embedded power device (e.g., a GPT12 block of an Infineon ePower device). In the foregoing embodiment, the Hall timing register 606 may be implemented using a Capture/Compare Register (CCR) included in the CCU, and the reload register 616 may be a Capture/Reload (CAPREL) register included in the GPT device.

Figure 7:
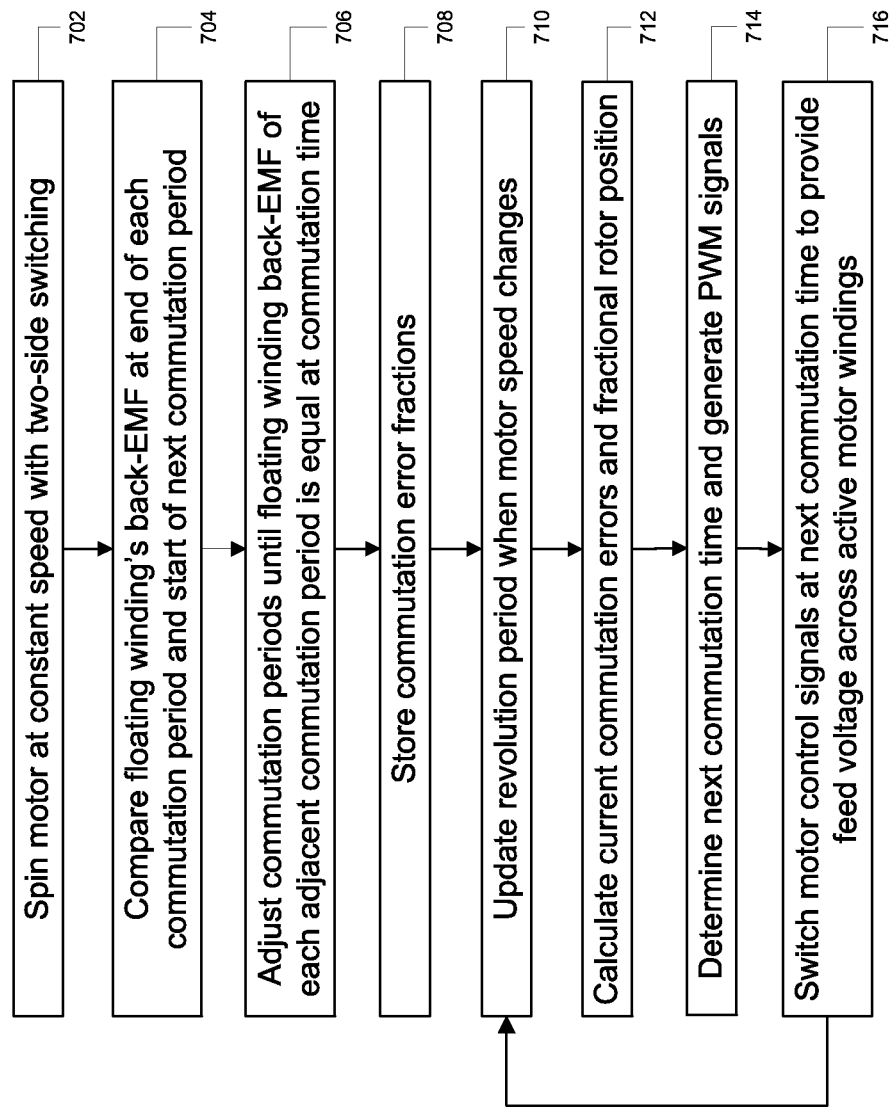
FIG. 7 is a flow diagram of a method of motor control in accordance with embodiments of the present invention.

FIG. 7 is a flow diagram of an embodiment method for calibrating and operating a brushless motor control system. At step 702, in an initial calibration sequence the motor is spun at a constant speed. During this calibration sequence, two-side chopping is used to reduce back-EMF noise. At step 704, the respective winding that is floating in each commutation period is used to calibrate the commutation times. The floating winding's back-EMF at the end of each commutation period is compared with the next floating winding's back-EMF at the start of the next commutation period. At step 706, the commutation periods are adjusted until the floating windings of each pair of adjacent commutation periods have an equal back-EMF at the respective commutation time that separates the commutation periods. At step 708, at the end of the calibration sequence, the calibrated commutation times are determined, and the commutation errors $e_0 \ldots e_5$ between the calibrated commutation times and the previous Hall transition times are calculated. These commutation errors are stored as a fraction of the calibration revolution period Tin a LUT. At step 710, the measured revolution period is updated when the motor speed changes. At step 712, this measured revolution period is used to measure the rotor position as a fraction of elapsed time relative to the current revolution period, and current commutation errors for the measured revolution period are calculated from the stored commutation error fractions. At step 714, the next commutation time is determined by delaying the latest Hall transition by one of these current commutation errors, and PWM pre-driver input signals and PWM commutation control signals are generated. In some embodiments, these PWM signals are sinusoidally weighted in accordance with the fractional rotor position. At step 716, the motor control signals are switched at the next commutation time in accordance with the commutation control signals to provide a one-side switched or two-side switched feed voltage and motor current across active motor windings.

Figure 8:
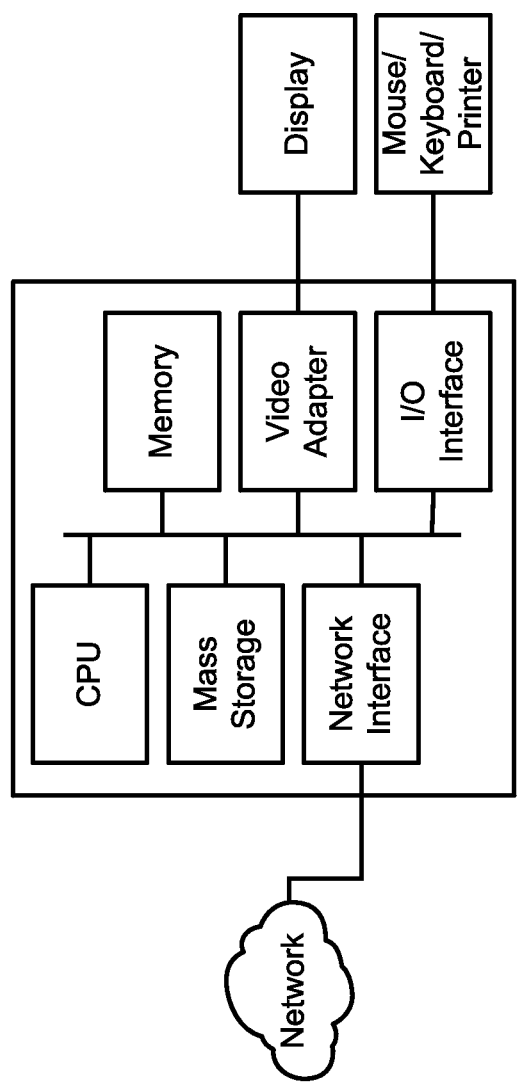
FIG. 8 is a block diagram of a processing system that may be used for implementing some of the devices and methods disclosed herein in accordance with embodiments of the present invention.

FIG. 8 shows a block diagram of a processing system that may be used for implementing some of the devices and methods disclosed herein. Specific devices may utilize all of the components shown, or only a subset of the components, and levels of integration may vary from device to device. Furthermore, a device may contain multiple instances of a component, such as multiple processing units, processors, memories, transmitters, receivers, etc. In an embodiment, the processing system comprises an embedded system. In other embodiments, the processing system comprises a computer workstation. The processing system may comprise a processing unit equipped with one or more input/output devices, such as a speaker, microphone, mouse, touchscreen, keypad, keyboard, printer, display, and the like. The processing unit may include a CPU, memory, a mass storage device, a video adapter, and an I/O interface connected to a bus. In an embodiment, multiple processing units in a single processing system or in multiple processing systems may form a distributed processing pool or distributed editing pool.

The bus may be one or more of any type of several bus architectures including a memory bus or memory controller, a peripheral bus, video bus, or the like. The CPU may comprise any type of electronic data processor. The memory may comprise any type of system memory such as random access memory (RAM), static RAM (SRAM), dynamic RAM (DRAM), synchronous DRAM (SDRAM), read-only memory (ROM), a combination thereof, or the like. In an embodiment, the memory may include ROM for use at boot-up, and DRAM for program and data storage for use while executing programs.

The mass storage device may comprise any type of storage device configured to store data, programs, and other information and to make the data, programs, and other information accessible via the bus. The mass storage device may comprise, for example, one or more of a solid state drive, hard disk drive, a magnetic disk drive, an optical disk drive, or the like.

The video adapter and the I/O interface provide interfaces to couple external input and output devices to the processing unit. As illustrated, examples of input and output devices include the display coupled to the video adapter and the mouse/keyboard/printer coupled to the I/O interface. Other devices may be coupled to the processing unit, and additional or fewer interface cards may be utilized. For example, a serial interface such as Universal Serial Bus (USB) (not shown) may be used to provide an interface for a printer.

The processing unit also includes one or more network interfaces, which may comprise wired links, such as an Ethernet cable or the like, and/or wireless links to access nodes or different networks. The network interface allows the processing unit to communicate with remote units via the networks. For example, the network interface may provide wireless communication via one or more transmitters/transmit antennas and one or more receivers/receive antennas. In an embodiment, the processing unit is coupled to a local-area network or a wide-area network for data processing and communications with remote devices, such as other processing units, the Internet, remote storage facilities, or the like. The network interface may be configured to have various connection-specific virtual or physical ports communicatively coupled to one or more of these remote devices.

In an embodiment, a method for motor control includes determining a next commutation time and applying a feed voltage across active windings of a motor at the next commutation time.

In another embodiment, the determining the next commutation time includes: retrieving, from a storage device, a current commutation error fraction included in a plurality of commutation error fractions each including a respective revolution period fraction; multiplying the current commutation error fraction and a first revolution period to determine a current commutation error; and determining the next commutation time in accordance with the current commutation error and a transition time of a plurality of position sensors coupled to the revolving motor.

In another embodiment, the method for motor control further includes calculating, during a calibration sequence, the plurality of commutation error fractions; and storing the plurality of commutation error fractions in the storage device.

In another embodiment, the motor is a brushless motor, the active windings include a first active winding and a second active winding, and the method further includes switching an inverter coupled to the motor. The inverter includes: a first terminal configured to be coupled to a cathode of a DC power supply, a second terminal configured to be coupled to an anode of the DC power supply, a first switch coupled between the first active winding and the first terminal, a second switch coupled between the second active winding and the second terminal, a first body diode coupling the first active winding to the second terminal, and a second body diode coupling the second active winding to the first terminal. The method further includes switching the inverter, at the next commutation time, such that the first switch and the second switch are closed, and switching the inverter, at a time occurring after the next commutation time, to open at least one of the first switch and the second switch.

In another embodiment, the calculating the plurality of commutation fractions includes measuring back-electromotive force (EMF) of the motor revolving in accordance with a calibration revolution period. The motor includes a plurality of windings each respectively selected to be in one of an activated state and a floating state in accordance with a timing pattern, and the timing pattern includes a first commutation time dividing a first period from a second period and a second commutation time dividing the second period from a third period. The calculating the plurality or commutation fractions further includes calculating a first commutation error such that when the first commutation time is delayed by the first commutation error, a first floating winding at an end of the first period has the same back-EMF as a second floating winding at a start of the second period. The calculating the plurality of commutation fractions also includes calculating a second commutation error such that when the second commutation time is delayed by the second commutation error, the second floating winding at an end of the second period has the same back-EMF as a third floating winding at a start of the third period. The calculating the plurality of commutation fractions also includes dividing the first commutation error and the second commutation error by the calibration revolution period.

In another embodiment, the method for motor control further includes switching the inverter at a start time of the first period such that the first switch and the second switch are closed. The method further includes switching the inverter at a time occurring after the start time of the first period such that the first switch and the second switch are open.

In another embodiment of the method for motor control, each transition time of a respective output pattern produced by position sensors includes at least one of a rising edge and a falling edge.

In another embodiment, the method for motor control further includes detecting one of a rising edge and a falling edge of one of the respective output patterns to determine the start time of the first revolution period.

In another embodiment, the method for motor control further includes determining an elapsed fraction of a first revolution period. The determining the elapsed fraction of the first revolution period includes adjusting a counter time interval in accordance with the first revolution period and incrementing a counter at an end of each counter time interval to provide the elapsed fraction of the first revolution period.

In another embodiment, the determining the first revolution period includes summing a plurality of transition periods bounded by the measured transition times of respective output patterns produced by position sensors.

In another embodiment, the method for motor control further includes determining a second revolution period of the motor. The determining the second revolution period includes: subtracting an earliest transition period in a plurality of transition periods from the first revolution period; adding a most recent transition period bounded by transition times of a plurality of position sensors; adjusting the counter time interval in accordance with the second revolution period; and incrementing the counter during each counter time interval to measure an elapsed fraction of the second revolution period.

In another embodiment of the method for motor control, a plurality of position sensors coupled to the revolving motor include a plurality of Hall sensors.

In an embodiment, a motor control circuit includes a plurality of windings each respectively selected to be in one of an activated state and a floating state in accordance with a timing pattern. The timing pattern includes a first commutation time dividing a first period from a second period, and a second commutation time dividing the second period from a third period. The motor control circuit is further configured to calculate a first commutation error such that when the first commutation time is delayed by the first commutation error, a first floating winding at an end of the first period has the same back-EMF as a second floating winding at a start of the second period. The motor control circuit is further configured to calculate a second commutation error such that when the second commutation time is delayed by the second commutation error, the second floating winding at an end of the second period has the same back-EMF as a third floating winding at a start of the third period. The motor control circuit is further configured to divide the first commutation error and the second commutation error by the calibration revolution period.

In another embodiment, the motor control circuit is further configured to store a plurality of commutation error fractions in a storage device.

In another embodiment, the circuit further includes an inverter coupled to the motor and the plurality of windings includes a first active winding and a second active winding. The inverter includes a first terminal configured to be coupled to a cathode of a DC power supply, a second terminal configured to be coupled to an anode of the DC power supply, a first switch coupled between the first active winding and the first terminal, a second switch coupled between the second active winding and the second terminal, and a first body diode coupling the first active winding to the second terminal. The motor control circuit is further configured to switch the inverter at a start time of the first period such that the first switch and the second switch are closed, and switch the inverter at a time occurring after the start time of the first period such that the first switch and the second switch are open.

In another embodiment of the motor control circuit, respective output patterns produced by position sensors each include at least one transition time that repeats in accordance with each revolution of the motor, and each transition time of the respective output patterns includes at least one of a rising edge and a falling edge.

In another embodiment, the motor control circuit is further configured to detect one of a rising edge and a falling edge of one of the respective output patterns to determine the start time of a first revolution period.

In another embodiment, the motor control circuit is further configured to: sum a first plurality of transition periods bounded by measured transition times of the respective output patterns to determine the first revolution period; retrieve, from the storage device, a current commutation error fraction; multiply the current commutation error fraction and the first revolution period to determine a current commutation error; and determine a next commutation time in accordance with the current commutation error and a transition time of a plurality of position sensors.

In another embodiment, the motor control circuit is further configured to switch the inverter at the next commutation time such that the first switch and the second switch are closed, switch the inverter at a time occurring after the next commutation time such that the first switch is open and the second switch is closed, and apply a feed voltage across active windings of the motor at the next commutation time.

In another embodiment, the motor control circuit is further configured to adjust a counter time interval in accordance with the first revolution period; and increment a counter at an end of each counter time interval to provide an elapsed fraction of the first revolution period.

In another embodiment, the motor control circuit is further configured to determine a second revolution period of the motor by summing a most recent transition period with a difference between an earliest transition period subtracted from the first revolution period, wherein the most recent transition period is bounded by transition times of the plurality of position sensors, and the earliest transition period is included in the first plurality of transition periods. The motor control circuit is further configured to adjust the counter time interval in accordance with the second revolution period, and increment the counter during each counter time interval to measure an elapsed fraction of the second revolution period.

In another embodiment of the motor control circuit, a plurality of position sensors coupled to the revolving motor includes a plurality of Hall sensors.

In another embodiment, the motor control circuit further includes a processor and a non-transitory computer-readable medium storing programming for execution by the processor.

In an embodiment, a motor controller includes a calibration circuit configured to be coupled to position sensors of a motor and to windings of the motor.

In another embodiment, the motor controller further includes a period determination circuit, which includes a timing register configured to accumulate a last N periods between signal transitions of the position sensors. The motor controller further includes a step-tick generator, which includes: a timer conversion unit configured to calculate a step size in accordance with the accumulated last N periods; a timer configured to count in accordance with the step size; and a toggle latch configured such that when the timer has finished counting, the toggle latch produces a pulse and restarts the timer counting in accordance with the step size.

In another embodiment, the motor controller further includes a microcontroller Capture/Compare Unit (CCU) and a General Purpose Timer (GPT) device. The microcontroller CCU includes a Capture/Compare Register (CCR), an input logic circuit, and an input timer. The CCR includes the timing register, the input logic circuit is included in the period determination circuit, and the input timer is included in the period determination circuit. The GPT device includes a Capture/Reload (CAPREL) register, the CAPREL register is included in the step-tick generator, and the position sensors include Hall sensors.

While this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments.

What is claimed is:

1. A method for motor control, the method comprising:
monitoring a plurality of position sensors coupled to a revolving motor, the monitoring comprising measuring transition times of respective output patterns produced by the position sensors, the respective output patterns each comprising at least one transition time that repeats in accordance with each revolution of the motor;
determining a first revolution period in accordance with the measured transition times; and
determining an elapsed fraction of the first revolution period that has elapsed since a start time of the first revolution period.

2. The method of claim 1, further comprising:
determining a next commutation time; and
applying a feed voltage across active windings of the motor at the next commutation time.

3. The method of claim 2, wherein the determining the next commutation time comprises:
retrieving, from a storage device, a current commutation error fraction comprised in a plurality of commutation error fractions each comprising a respective revolution period fraction;
multiplying the current commutation error fraction and the first revolution period to determine a current commutation error; and
determining the next commutation time in accordance with the current commutation error and a transition time of the plurality of position sensors.

4. The method of claim 3, further comprising:
calculating, during a calibration sequence, the plurality of commutation error fractions; and
storing the plurality of commutation error fractions in the storage device.

5. The method of claim 4, wherein:
the motor is a brushless motor; and
the active windings comprise a first active winding and a second active winding; and
the method further comprises:
switching an inverter coupled to the motor, the inverter comprising:
a first terminal configured to be coupled to a cathode of a DC power supply;
a second terminal configured to be coupled to an anode of the DC power supply;
a first switch coupled between the first active winding and the first terminal;
a second switch coupled between the second active winding and the second terminal;
a first body diode coupling the first active winding to the second terminal; and
a second body diode coupling the second active winding to the first terminal;
switching the inverter, at the next commutation time, such that the first switch and the second switch are closed; and
switching the inverter, at a time occurring after the next commutation time, to open at least one of the first switch and the second switch.

6. The method of claim 5, wherein the calculating the plurality of commutation fractions comprises:
  measuring back-electromotive force (EMF) of the motor revolving in accordance with a calibration revolution period, wherein the motor comprises a plurality of windings each respectively selected to be in one of an activated state and a floating state in accordance with a timing pattern, the timing pattern comprising:
    a first commutation time dividing a first period from a second period; and
    a second commutation time dividing the second period from a third period; and
  calculating a first commutation error such that when the first commutation time is delayed by the first commutation error, a first floating winding at an end of the first period has the same back-EMF as a second floating winding at a start of the second period;
  calculating a second commutation error such that when the second commutation time is delayed by the second commutation error, the second floating winding at an end of the second period has the same back-EMF as a third floating winding at a start of the third period; and
  dividing the first commutation error and the second commutation error by the calibration revolution period.

7. The method of claim 6, the method further comprising:
  switching the inverter at a start time of the first period such that the first switch and the second switch are closed; and
  switching the inverter at a time occurring after the start time of the first period such that the first switch and the second switch are open.

8. The method of claim 1, wherein each transition time of the respective output pattern comprises at least one of a rising edge and a falling edge.

9. The method of claim 1, further comprising detecting one of a rising edge and a falling edge of one of the respective output patterns to determine the start time of the first revolution period.

10. The method of claim 1, wherein the determining the elapsed fraction of the first revolution period comprises:
  adjusting a counter time interval in accordance with the first revolution period; and
  incrementing a counter at an end of each counter time interval to provide the elapsed fraction of the first revolution period.

11. The method of claim 10, wherein the determining the first revolution period comprises summing a plurality of transition periods bounded by the measured transition times.

12. The method of claim 11, further comprising:
  determining a second revolution period of the motor, comprising:
    subtracting an earliest transition period in the plurality of transition periods from the first revolution period;
    adding a most recent transition period bounded by transition times of the plurality of position sensors;
  adjusting the counter time interval in accordance with the second revolution period; and
  incrementing the counter during each counter time interval to measure an elapsed fraction of the second revolution period.

13. The method of claim 1, wherein the plurality of position sensors comprise a plurality of Hall sensors.

14. A motor control circuit configured to:
  monitor a plurality of position sensors coupled to a revolving motor, the monitoring comprising measuring transition times of respective output patterns produced by the position sensors;
  measure back-electromotive force (EMF) of the motor revolving in accordance with a calibration revolution period; and
  calculate, during a calibration sequence, a plurality of commutation error fractions relative to the measured transition times.

15. The motor control circuit of claim 14, wherein:
  the motor comprises a plurality of windings each respectively selected to be in one of an activated state and a floating state in accordance with a timing pattern, the timing pattern comprising:
    a first commutation time dividing a first period from a second period; and
    a second commutation time dividing the second period from a third period; and
  the motor control circuit is further configured to:
    calculate a first commutation error such that when the first commutation time is delayed by the first commutation error, a first floating winding at an end of the first period has the same back-EMF as a second floating winding at a start of the second period;
    calculate a second commutation error such that when the second commutation time is delayed by the second commutation error, the second floating winding at an end of the second period has the same back-EMF as a third floating winding at a start of the third period; and
    divide the first commutation error and the second commutation error by the calibration revolution period.

16. The motor control circuit of claim 15, further configured to store the plurality of commutation error fractions in a storage device.

17. The motor control circuit of claim 16, further comprising an inverter coupled to the motor, wherein:
  the plurality of windings comprises a first active winding and a second active winding;
  the inverter comprises:
    a first terminal configured to be coupled to a cathode of a DC power supply;
    a second terminal configured to be coupled to an anode of the DC power supply;
    a first switch coupled between the first active winding and the first terminal;
    a second switch coupled between the second active winding and the second terminal; and
    a first body diode coupling the first active winding to the second terminal; and
  the motor control circuit is further configured to:
    switch the inverter at a start time of the first period such that the first switch and the second switch are closed; and
    switch the inverter at a time occurring after the start time of the first period such that the first switch and the second switch are open.

18. The motor control circuit of claim 17, wherein:
  the respective output patterns each comprise at least one transition time that repeats in accordance with each revolution of the motor; and
  each transition time of the respective output patterns comprises at least one of a rising edge and a falling edge.

19. The motor control circuit of claim 18, further configured to detect one of a rising edge and a falling edge of one of the respective output patterns to determine the start time of a first revolution period.

20. The motor control circuit of claim 19, further configured to:
sum a first plurality of transition periods bounded by the measured transition times to determine the first revolution period;
retrieve, from the storage device, a current commutation error fraction;
multiply the current commutation error fraction and the first revolution period to determine a current commutation error; and
determine a next commutation time in accordance with the current commutation error and a transition time of the plurality of position sensors.

21. The motor control circuit of claim 20, further configured to:
switch the inverter at the next commutation time such that the first switch and the second switch are closed;
switch the inverter at a time occurring after the next commutation time such that the first switch is open and the second switch is closed; and
apply a feed voltage across active windings of the motor at the next commutation time.

22. The motor control circuit of claim 21, further configured to:
adjust a counter time interval in accordance with the first revolution period; and
increment a counter at an end of each counter time interval to provide an elapsed fraction of the first revolution period.

23. The motor control circuit of claim 22, further configured to:
determine a second revolution period of the motor by summing a most recent transition period with a difference between an earliest transition period subtracted from the first revolution period, wherein
the most recent transition period is bounded by transition times of the plurality of position sensors, and
the earliest transition period is comprised in the first plurality of transition periods;
adjust the counter time interval in accordance with the second revolution period; and
increment the counter during each counter time interval to measure an elapsed fraction of the second revolution period.

24. The motor control circuit of claim 14, wherein the plurality of position sensors comprise a plurality of Hall sensors.

25. The motor control circuit of claim 14, further comprising:
a processor; and
a non-transitory computer-readable medium storing programming for execution by the processor.

26. The motor control circuit of claim 14, comprising:
a position-generating circuit comprising:
a period determination circuit configured to be coupled to the position sensors; and
a step-tick generator, coupled to an output of the period determination circuit, the step-tick generator configured to produce a predetermined number of pulses in one period determined by the period determination circuit.

27. The motor control circuit of claim 26, wherein:
the period determination circuit comprises a timing register configured to accumulate a last N periods between signal transitions of the position sensors; and
the step-tick generator comprises:
a timer conversion unit configured to calculate a step size in accordance with the accumulated last N periods;
a timer configured to count in accordance with the step size; and
a toggle latch configured such that when the timer has finished counting, the toggle latch produces a pulse and restarts the timer counting in accordance with the step size.

28. The motor control circuit of claim 27, further comprising:
a microcontroller Capture/Compare Unit (CCU); and
a General Purpose Timer (GPT) device, wherein:
the microcontroller CCU comprises a Capture/Compare Register (CCR), an input logic circuit, and an input timer;
the CCR comprises the timing register;
the input logic circuit is comprised in the period determination circuit;
the input timer is comprised in the period determination circuit;
the GPT device comprises a Capture/Reload (CAPREL) register;
the CAPREL register is comprised in the step-tick generator; and
the position sensors comprise Hall sensors.

* * * * *